United States Patent [19]

Minakami et al.

[11] Patent Number: 5,655,244

[45] Date of Patent: Aug. 12, 1997

[54] LONG OR SUPER LONG BRIDGE WITH AN AUTOMATIC TRANSPORTING SYSTEM

[76] Inventors: Hiroyuki Minakami, 2-1-1 #109, Nishi Okamoto Higashinada-ku Kobe, 658 Hyogo Prefecture; Motoyuki Minakami, 1-6-16, Agenogi Matue, 690 Shimane Prefecture, both of Japan

[21] Appl. No.: 657,052

[22] Filed: May 28, 1996

Related U.S. Application Data

[63] Continuation of Ser. No. 353,686, Dec. 12, 1994, abandoned.

[30] Foreign Application Priority Data

Dec. 13, 1993 [JP] Japan ................... 5-345725

[51] Int. Cl.⁶ .................... E01D 11/00; E01D 18/00
[52] U.S. Cl. .................... 14/78; 104/18; 104/20; 410/3; 404/1
[58] Field of Search .................. 14/72.5, 78; 404/1; 104/18, 25, 20; 410/3, 26

[56] References Cited

U.S. PATENT DOCUMENTS

| | | | |
|---|---|---|---|
| 3,858,518 | 1/1975 | Nyman | 104/18 X |
| 3,861,315 | 1/1975 | Rypinski | 104/18 |
| 3,933,258 | 1/1976 | Forsyth et al. | 214/85 |
| 4,738,575 | 4/1988 | Bludgett et al. | 410/26 X |
| 4,966,510 | 10/1990 | Johnson, Jr. | 410/3 |
| 5,249,532 | 10/1993 | Perrot | 410/3 X |

FOREIGN PATENT DOCUMENTS

| | | | |
|---|---|---|---|
| 4-143 | 8/1987 | Japan . | |
| 3-80203 | 1/1989 | Japan . | |
| 269203 | 9/1992 | Japan | 404/1 |

Primary Examiner—James Lisehora
Attorney, Agent, or Firm—Limbach & Limbach L.L.P.

[57] ABSTRACT

An automatic vehicle transportation system (AVTS) is installed on a long or super long bridge in order to lighten and permit elongation of the entire bridge structure. The transportation system includes mode converting interchanges, automatic transportation lanes, trucks or pallets on which vehicles are mobilized, garages for trucks or pallets, converting lanes for trucks or pallets, merging and diverging ramps, toll gates, embarkation entrances and disembarkation exits, a fiber optic cable and a control center. In this innovative design, solar cells, a beat pump, bicycle paths, motorcycle paths, a green zone, shops and walkways for people may be located on the bridge floor. It is also possible to install the automatic vehicle transportation system inside the box girder or the lower deck of a truss girder without polluting the inside air of the girder.

17 Claims, 5 Drawing Sheets

LONG OR SUPER LONG BRIDGE WITH AN AUTOMATIC TRANSPORTING SYSTEM

This a continuation of Application Ser. No. 08/353,686 filed Dec. 12, 1994 now abandoned.

BACKGROUND OF THE INVENTION

1. Field of the Invention

The present invention is related generally to bridge transportation systems, and in particular to a bridge structure and transportation system which employs pallets or trucks which are controlled to transport vehicles or containers across a bridge.

2. Description of the Prior Art

In the present design of road bridge transportation systems, automobiles are simply driven across the span of the road floor. However, there are other possible transportation systems that can be implemented on bridges, for example, the "piggy-back system" or car-train system" in which the vehicle, rather than being simply driven across the span of the road floor, is carried on the wagon of a train which transports many vehicles simultaneously. There have also been two newly developed and patented methods of accommodating the traffic systems of bridges that cross longer distances such as ocean straits or wide rivers:

1. A long or super long bridge which can sustain several traffic lanes (see Japanese PAT publication No. H3-80203).
2. A lighter-weight bridge structure, engineered through the use of lighter and stronger materials (see Japanese PAT publication No. H4-143).

SUMMARY OF THE INVENTION

To the present, efforts to create super long bridges have proved incompatible with current bridge design systems. For example, the traditional multi-laned bridge system, using a box or truss girder in its construction, is restricted to a maximum length of between two to three kilometers and a maximum width of approximately 30 meters, due to the limitations of existing materials. Sag ratio, which is the sag length over span length, should be 1/10. (Sag length: the vertical length between the span and the lowest point of the cable when the cable is stretched from one end to the other). The maximum breaking point of the cable itself before breaking under its own weight is five to six kilometers. Therefore, the maximum length of the cable itself before breaking with hanging girders for several vehicle lanes becomes approximately two to three kilometers. These restraints could be overcome through the use of newly developed, lighter materials. However, such materials have not been successfully utilized: either they are too difficult to produce or the cost of doing so is prohibitive.

Bridge Piers

Another problem encountered when attempting to design long or super long bridges is the difficulty of installing bridge piers onto the ocean floor. In the case of the Akashi bridge (now under construction in Japan with the world's longest center span of nearly two kilometers), the seabed for sustaining the piers lies at 60 to 70 meters below sea level, a manageable depth using present technology. However, when constructing a long or super long bridge (10 kilometers or longer), capable of spanning the length of the Strait of Gibraltar, Sunda Strait in Indonesia, Houyo or Tsugaru Straits in Japan etc., the bridge piers would have to be embedded at a depth of over 100 meters below sea level. The huge cost of doing so would render such a project unfeasible.

Traffic Demands

If the span of the bridge is to be elongated, the system must still be able to meet high levels of vehicle traffic. Most long bridges have multiple lanes for vehicles. The Akashi bridge, for example, will have a total of six lanes. It is expected that a bridge crossing the Strait of Gibraltar, Sunda Strait or Tsugaru Strait, would have a higher traffic density and therefore six lanes would not be sufficient. This causes a major problem, in that if additional lanes are necessary, the bridge becomes impossible to build, as its weight will be heavier than the theoretical maximum tolerance of the bridge. Furthermore, one to two-ton cars must utilize the same traffic lanes as trucks exceeding more than 20 tons. The bridge is therefore designed to support the heaviest vehicles, making the bridge road heavier, and finally, forcing the length of the bridge to become shorter.

Limitations of Alternative Systems

As mentioned above, two possible alternatives to conventional bridge transportation systems are the piggy-back and car train systems. However, in both cases, carried vehicles are mobilized not individually but rather as a group. Thus, drivers are denied free access to the bridge and must bear the inconvenience of having to wait before being loaded upon the bridge transportation system. Certainly it is preferable—especially from a driver's point of view—to utilize a bridge transportation system which allows vehicles free and independent access to the bridge floor. An additional drawback of the piggy-back or car-train system is that the railroad car train itself is usually very heavy, increasing the total weight of the bridge girder and limiting the length of the bridge span.

Pedestrian Walkways and Bicycle Paths

One of the difficulties in designing a long or super long bridge capable of absorbing a heavy traffic demand is providing sufficient space for a pedestrian walkway. Installing a pedestrian walkway means adding additional surface area to the bridge, resulting in a structure that is both heavier and more unstable against the wind. A longer span then becomes impossible. Also, from and economic point of view, the bridge designer would rather install a road lane for vehicles than a pedestrian path. This is why the Akashi and Onaruto bridge in Japan have been designed without pedestrian walkways.

A lack of designated lanes for bicycles and motorcycles on a long bridge system poses another problem. The purpose of this invention is not only to construct a longer bridge with the ability to absorb higher traffic demands, but also to provide bicycles, motorcycles, and pedestrians with equal access to the bridge system.

OBJECTIVES OF THE INVENTION

To solve the problems of bridge construction described above, this invention incorporates into the design of long or super long bridges an innovative, advanced transportation system which allows vehicles to be mobilized on a moving pallet (this will be further explained in a following section of this invention). In addition, we assert that the space of the bridge floor, usually occupied exclusively with automobile road lanes, is not perfectly utilized, especially from an energy point of view. We propose that the floor space be used as an energy source: solar panels are installed on the floor surface, providing energy to power the transportation system of the bridge. This new bridge concept will be both energy efficient and environmentally friendly.

The main objectives of this invention are as follows:

1. To provide a longer span bridge which can accommodate a heavy traffic demand.
2. To build a lighter bridge structure in order to reduce the number of bridge piers.

3. To allow bicycles, motorcycles and pedestrians free access to the bridge floor.

To meet the objectives of this invention, the fundamental concept of crossing a bridge must be carefully examined. Generally, when a vehicle crosses a bridge it has no choice but to continue straight along the bridge road. This means that the vehicle could be easily controlled by external means, as a bridge is usually a straight road with little or no grade. Thus, the installation of an automatic vehicle transportation system could easily replace the usual highway system. Since drivers are accustomed to driving directly across a bridge road without stopping, they would have little difficulty accepting the external mobilization of their vehicles, indeed welcoming the opportunity to relax and enjoy the view while their vehicles are in transit.

The basic concept of this invention is that when an automatic vehicle transportation system is installed, it is possible to distribute load weight on the bridge structure much more evenly than it is on other systems (i.e. the piggy-back and car-train systems etc.). A more even distribution of weight means that a lighter girder structure is possible. Since the mobilizing system controls the length between mobilizing units, fewer traffic lanes are necessary, resulting in a more efficient use of bridge floor space. Fewer lanes and a lighter structure allow for an increase in the length of the bridge span.

Recently, many complex types of automatic vehicle mobilizing systems have been proposed, most of which are still in the early developmental stages. In these systems, each vehicle is equipped with highly advanced sensors. The road has traffic condition sensors and an AI (artificial intelligence) control system which detects all information about road conditions. After the information is analyzed by the AI system, signals are sent out which control all transportation movements. In this type of bridge transportation system, each vehicle must be equipped with very highly complex sensors and regulators. If a vehicle does not have the necessary equipment, it cannot be automatically controlled. The cost of installing these sensors and regulators in all vehicles would be highly prohibitive.

By contrast, the system we propose mobilizes all vehicles without the use of an automatic navigation system. In this invention, to solve the problems described above, vehicles are first placed onto an unmanned truck or pallet. The truck or pallet is then mobilized into the bridge transportation system. (There are several means by which the truck or pallet may be mobilized: conventional railway, a rail or guide way assisted by a linear motor, cable car, lift carrying system, conveyor etc.) Controlled by positioning sensors, motors and regulators, each truck or pallet moves automatically from one toll gate to the other, circulating continuously within the bridge transportation system. It is therefore the control center (see FIG. 1) that is responsible for the transportation of the vehicle, not the vehicle or the vehicle driver.

In this invention, in order to create a uniform distribution of traffic on the bridge, a random access method of vehicle loading is adopted. This concept is entirely different from the conventional railroad system, and is a major advantage of this invention. In the piggy-back rail system, vehicles are mobilized according to a predetermined train schedule. Random access of vehicles to the bridge is therefore lost, making such a system unpopular amongst users. In the case of the Seikan Tunnel in Japan—a car train system—vehicle demand has been steadily declining. Motorists will simply not use a piggy-back or car-train system that compromises the random accessibility that vehicles usually have on the regular road. We introduce an invention that solves the problem of random accessibility while at the same time enabling the construction of a significantly lighter bridge structure.

DETAILED DESCRIPTION

Vehicle Movement in the Bridge Transportation System

Figure 1:
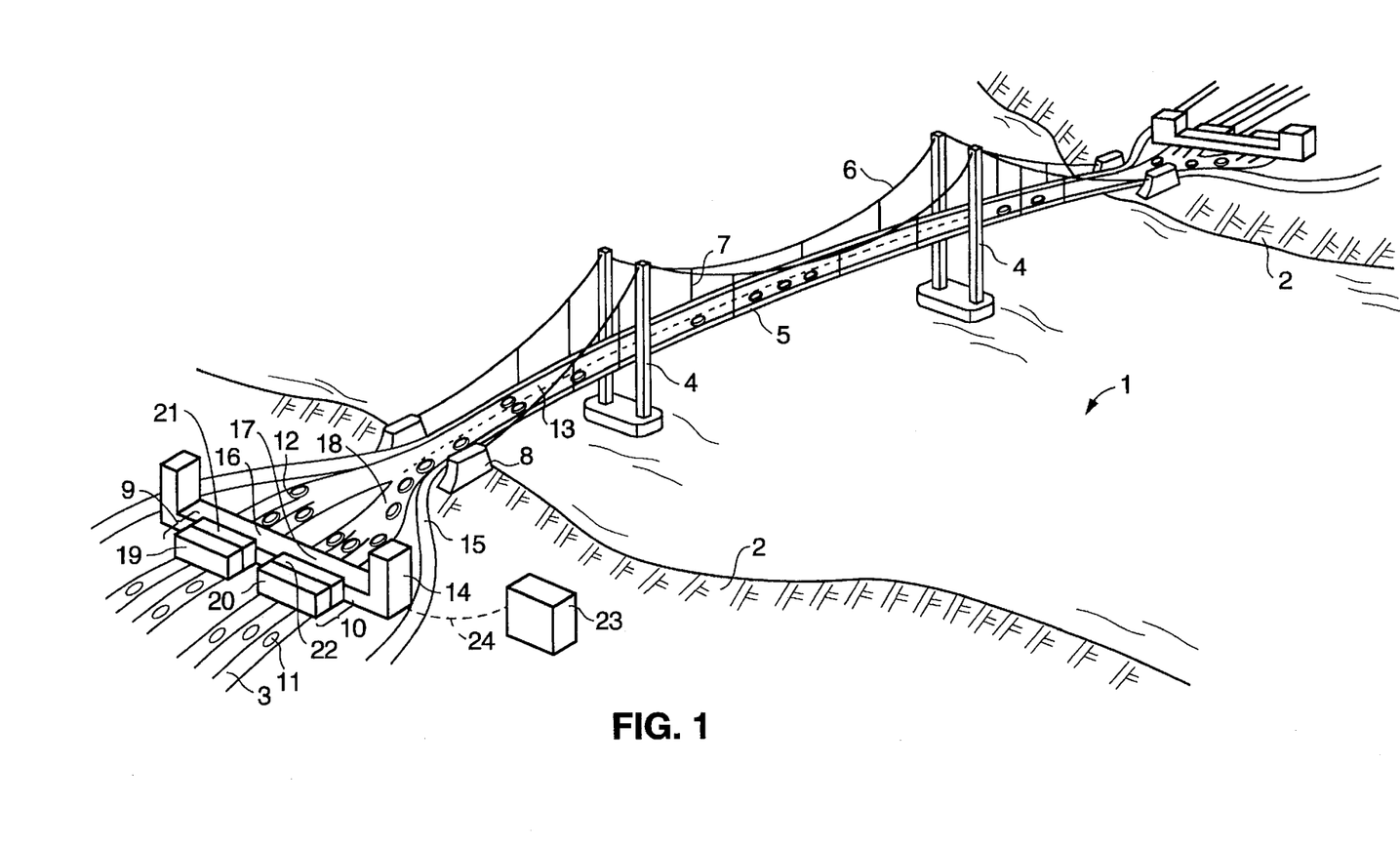
FIG. 1 illustrates a bird's-eye view of a long suspension bridge with an Automatic vehicle transportation System (AVTS).

Vehicle transfer across the bridge system begins when motorists drive their vehicles to the mode converting interchange (MCI) (see FIG. 1). The MCI consists of the toll gate and the entrance and exit for the truck or pallet. Here, vehicles are rapidly loaded and fixed (either manually or automatically) to the floor of a waiting truck or pallet. The driving mode of the vehicle is then transferred from the driver to the automatic control of the mobilizing system. At this point, the truck or pallet proceeds to the merging ramp, enters the main roadway and travels to the MCI on opposite side of the bridge.

As used herein, the term truck-vehicle refers to trucks which are vehicles, and not to the trucks or pallets which are used to transport to vehicles (such as truck-vehicles) in the subject invention.

Lane Width Specifications

The tread span of a typical passenger vehicle is approximately 1.5 meters. Even if the dimensions of the truck or pallet were to add an extra 1 meter of width, the total width would be only 2.5 meters. Therefore, a width of 2.5 meters for the main pathway of an automatic truck or pallet mobilizing lane would be sufficient for a passenger vehicle. If four lanes were installed, the total width would be approximately 10 meters. As explained below, four traffic lanes in our design would be sufficient to accommodate the traffic demands of a conventional six-lane bridge.

Vehicle Traffic Control

When an automatic vehicle transportation system is implemented, the distance separating the head of one moving truck or pallet from the tail of the next can be diminished to between 1 meter to 2 meters or even close to 0 meters. Thus, traffic capacity is expanded several times in comparison to a conventional road lane. As more traffic capacity becomes necessary, such a system requires neither the difficult and costly installation of more lanes, nor the construction of a second bridge; rather, it is simply a matter of setting less distance between the trucks or pallets and/or controlling their speed.

Further Structural Innovations and Advantages

A decrease in the width of transportation lanes and a reduction of the total number of required traffic lanes means that the width of the walkways can be expanded while maintaining the same traffic capacity of the bridge. Moreover, the reduced weight of the bridge permits the installation of solar cells or heat absorbing materials on the surface of the bridge floor without the danger of it collapsing under the additional load. The surface of the bridge can be painted a black color in order to absorb the heat from the sun and to melt snow more efficiently.

Usually, a vehicle lane cannot be installed in a box girder bridge because the enclosed space of the girder causes severe air pollution. However, in this innovative transportation system, vehicle engines are shut off and the mobilizing truck or pallet is driven by non-fossil fuel energy such as electricity. Thus, no air pollution is created and the system can be installed in the box girder. In the case of a truss girder structure, the transportation system is installed on the lower deck of a double-deck bridge. The entire upper deck is then available to accommodate a pedestrian walkway, bicycle and/or motorcycle paths. This type of bridge transportation system has never before been implemented.

When vehicles are transported by an automatic vehicle transportation system, the center divider between lanes of opposite direction traffic is no longer necessary. By eliminating the center divider, the weight of the bridge floor is decreased and the width of the floor can be widened. Also, the transportation system is installed at the weight center of the floor. Therefore, the bending moment is significantly decreased. The decrease in bending moment makes the total weight of the bridge lighter than a conventional bridge. In the case of installing a transportation system for heavier vehicles such as trucks inside a box girder, the heaviest weight is loaded onto the center of the bridge floor, thus extra structure strength against the bending moment is no longer necessary. The structural of the bridge can be then simpler, lighter, narrower and longer.

DETAILED DESCRIPTION OF THE PREFERRED EMBODIMENTS

FIG. 1 illustrates a bird's-eye view of a long suspension bridge with an Automatic vehicle transportation system (AVTS). The main towers 4 are installed in the floor of the strait 1. The anchorages 8 are installed at both banks, and the main cables 6 are tightened between the anchorages 8 through the main towers 4. Connected to the main cables 6 are the hanger cables 7 from which hang the girders 5. At either side of the bridge, on the strait coast 2 is a mode converting interchange (MCI) entrance 9 and another MCI exit 10. Each MCI functions both as a vehicle loading 9 or unloading 10 are for trucks or pallets, and as a toll gate 19 and 20.

The MCI (entrance) 9, is comprised of the toll gate (entrance) 19 and the embarkation area 21 where the vehicle is loaded onto the truck or pallet (this operation can be performed either manually or automatically; fixing the vehicle to the truck or pallet can be easily carried out by robot). The mobilizing unit then proceeds to the merging ramp 17. The merging ramp includes the area from each embarkation entrance 21 through to the automatic transportation lane 13 over which the truck or pallet 12 carries the vehicle 11. The MCI (exit) 10 is comprised of the automatic transporting lane 13, the diverging ramp 18 which connects the automatic transporting lane 13 with the disembarkation exit 22 and the toll gate (exit) 20.

In FIG. 1, the truck or pallet 12 carries a vehicle 11 while moving on the automatic transporting lane 13, toward the other side of the toll gate. Fully automatic transporting methods of allowing the truck or pallet to run on the transporting lane may be utilized; electromagnetic, magnetic, laser or optical leading systems could be employed. The merging and diverging of the truck or pallet is implemented by the installation of a regulating sensor onto the truck or pallet which constantly monitors the position of the truck or pallet. Data collected are transferred to the control center 23, which in turn regulates the movement of vehicles.

A rotating cable such as that utilized in a ski lift maybe the preferred method of providing a driving force for the truck or pallet in the automatic transporting lane 13. The gripping of this rotating cable by the truck or pallet would be accomplished in the same manner as that of a cable car in San Francisco.

The truck or pallet 12 is shuffled between opposite toll gates 19 on the bridge in the following manner: A truck or pallet 12 moving across the bridge in the automatic transporting lane 13 proceeds to the diverging ramp 18. It then passes through to the disembarkation exit 22 where the vehicle 11 is unloaded from the truck or pallet 12. The vehicle 11 exits via the MCI (exit) 10 and enters the roadway 3. The empty truck or pallet 12 then proceeds to the MCI (entrance) 9 via the converting lane for the truck or pallet 16. At the truck or pallet embarkation point 21 the truck or pallet then waits to load a new vehicle 11 which will be transferred across the bridge to the opposite toll gate 19.

The amount of traffic coming from opposite toll gates is not always equal. In order to balance the traffic flow, the truck or pallet is periodically sent across the bridge without a loaded vehicle. A garage 14 for truck or pallet 12 is installed to ensure a surplus stock of trucks or pallets is available to accommodate unexpectedly high volumes of traffic. The installation of an automatic stock control system such as this would be an optional matter.

The transportation system is controlled by the control center 23. Data regarding all trucks or pallets 12 are collected in real time by a central computer. The computer then directs the movements of all trucks or pallets 12 by sending instructions through the fiber optic cable 24 to the automatic transporting lane 13.

FIG. 1 illustrates the transfer of vehicles across the bridge system. However, containers could be transferred in basically the same manner. In this case, the MCI (entrance) 9 becomes a container yard entrance, and the MCI (exit) 10 becomes a container yard exit. The operation of loading and unloading containers is carried out by a crane or by the utilization of a sliding van system (a sliding method from the truck or pallet 12 to the van and vice-versa). Automation of container loading and unloading would expedite the operation. One of the automatic transporting lanes 13-B could be designated for both larger-sized vehicles and the transportation of containers (see FIG. 4).

Figure 2:
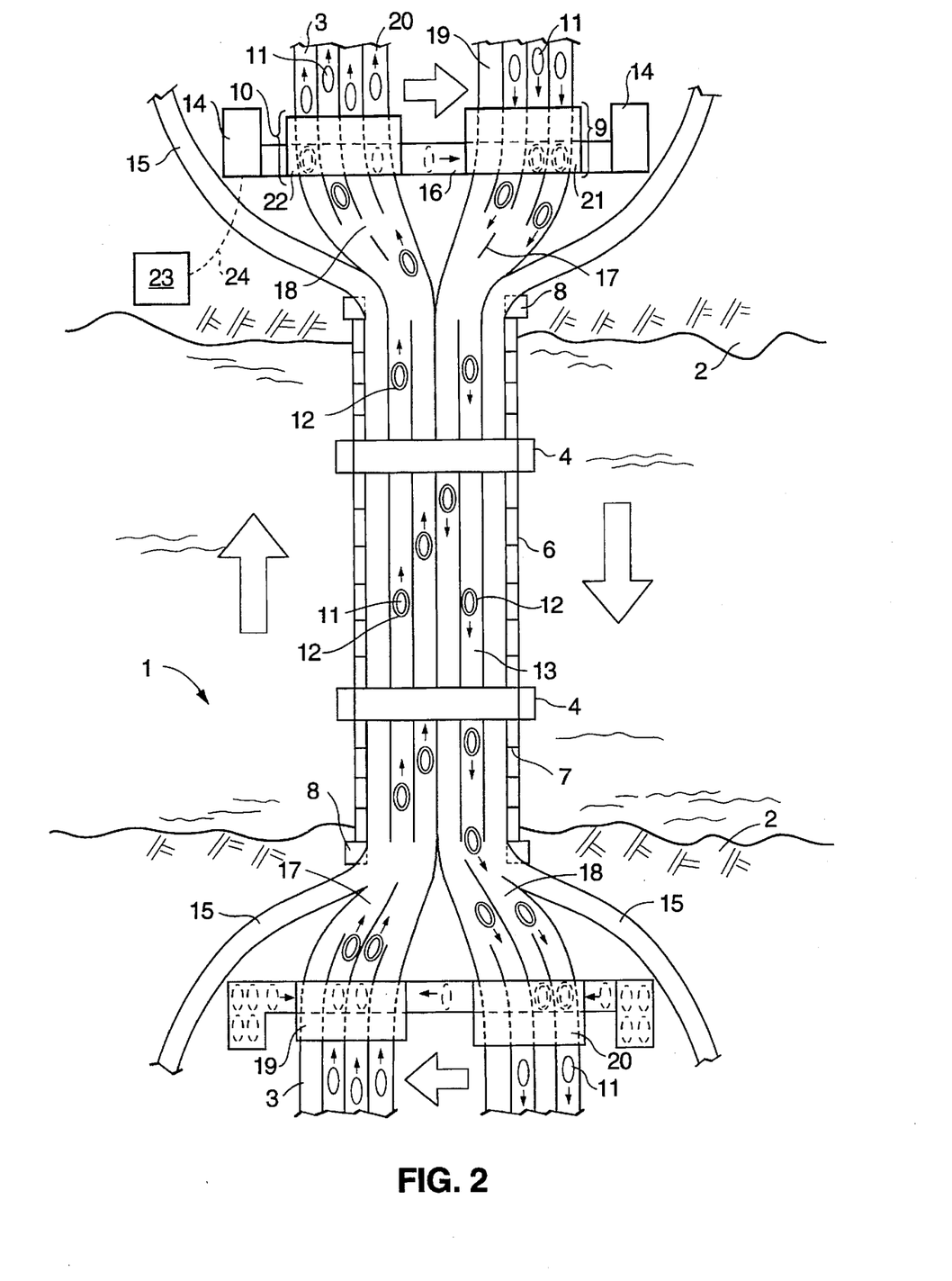
FIG. 2 illustrates a top view of a super long suspension bridge equipped with an automatic vehicle transportation system.

FIG. 2 shows a top view of a super long suspension bridge equipped with an automatic vehicle transportation system. Four automatic transporting lanes 13 are installed on the girder 5. The trucks or pallets 12 shuttle between opposite toll gates via the automatic transport lane 13. In the illustrated example of FIG. 2, all the trucks or pallets are specially designated for the transportation of cars and move in a clockwise direction. However, trucks or pallets may be constructed to accommodate any size vehicle and vehicle circulation could just as easily flow in a counter-clockwise direction.

The potential traffic capacity of FIG. 2 is as follows: On a normal highway, vehicles travel at a speed of about 80 km/h. Vehicles usually maintain a safe distance between each other of around 80 meters. This invention, however, virtually eliminates the need for a safe distance between vehicles. As a result, the capacity of the transportation system is then made 16 times greater [80 meters ÷5 meters (length of truck or pallet)=16] than that of a regular highway system.

The total length of the bridge shown in FIG. 2 is about 10 km. If the automatic transportation lane 13 is full, the number of the trucks or pallets employed to carry vehicles would be 16,000 vehicles per hour. A regular highway usually has a traffic capacity of about 1,000 vehicles per hour. The highest traffic capacity of this bridge with automatic transportation system is then 1,000×16=16,000, making traffic capacity on this bridge much higher than that of a conventional bridge. To absorb the heaviest of traffic demands, the system must be installed with a sufficient number of toll gates and MCIs. FIG. 2 shows a total of eight toll gates: four at each respective entrance and exit. The number of open toll gates and MCIs may be increased and decreased as required.

Figure 3:
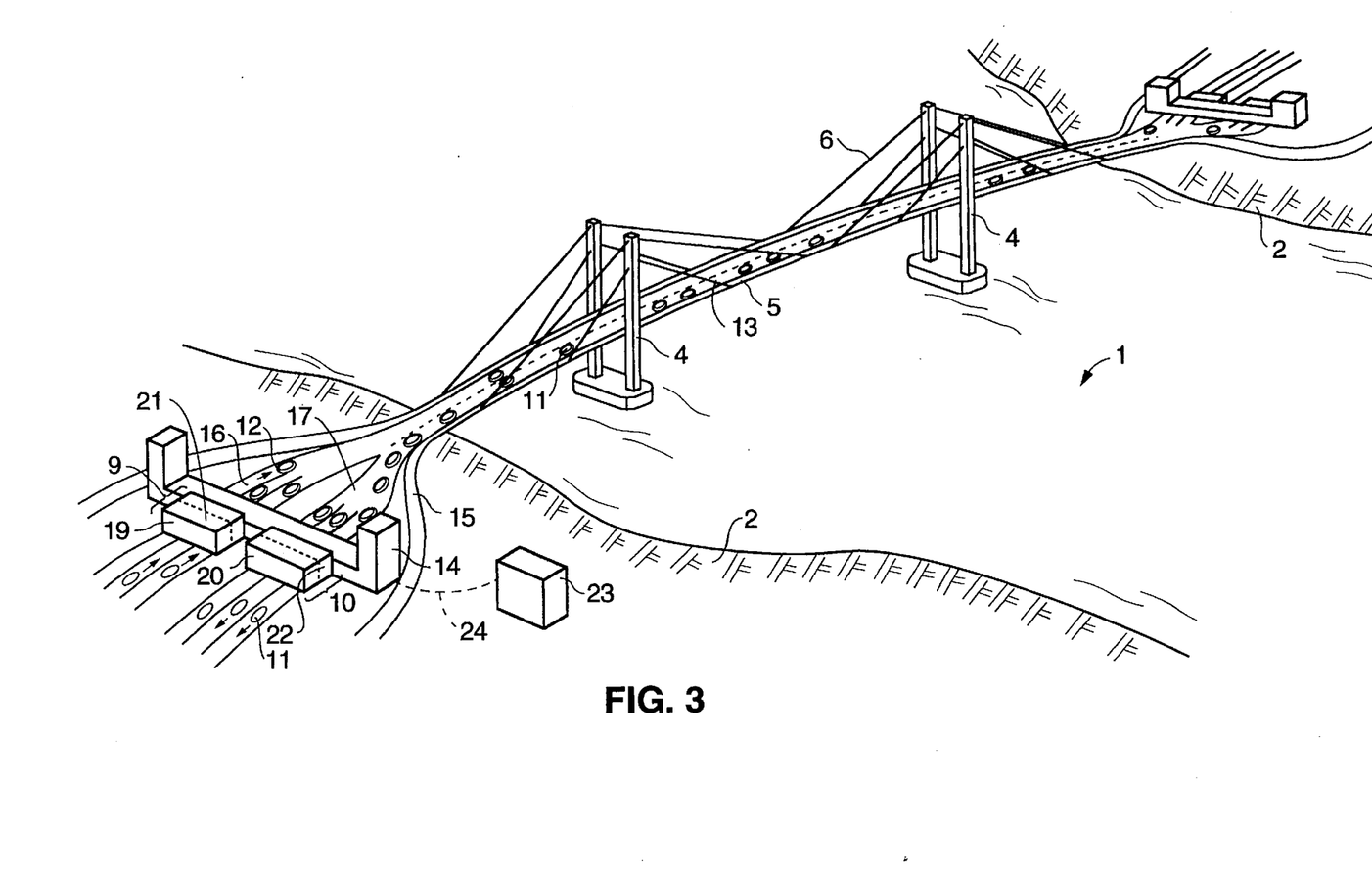
FIG. 3 illustrates a bird's-eye view of the transportation system installed on a cable stayed bridge.

FIG. 3 illustrates a bird's-eye view of the transportation system installed on a cable stayed bridge. The type of the bridge structure utilized, whether cable-stayed or suspension, really makes no difference to the installation of the bridge transportation system proposed in this invention.

Figure 4:
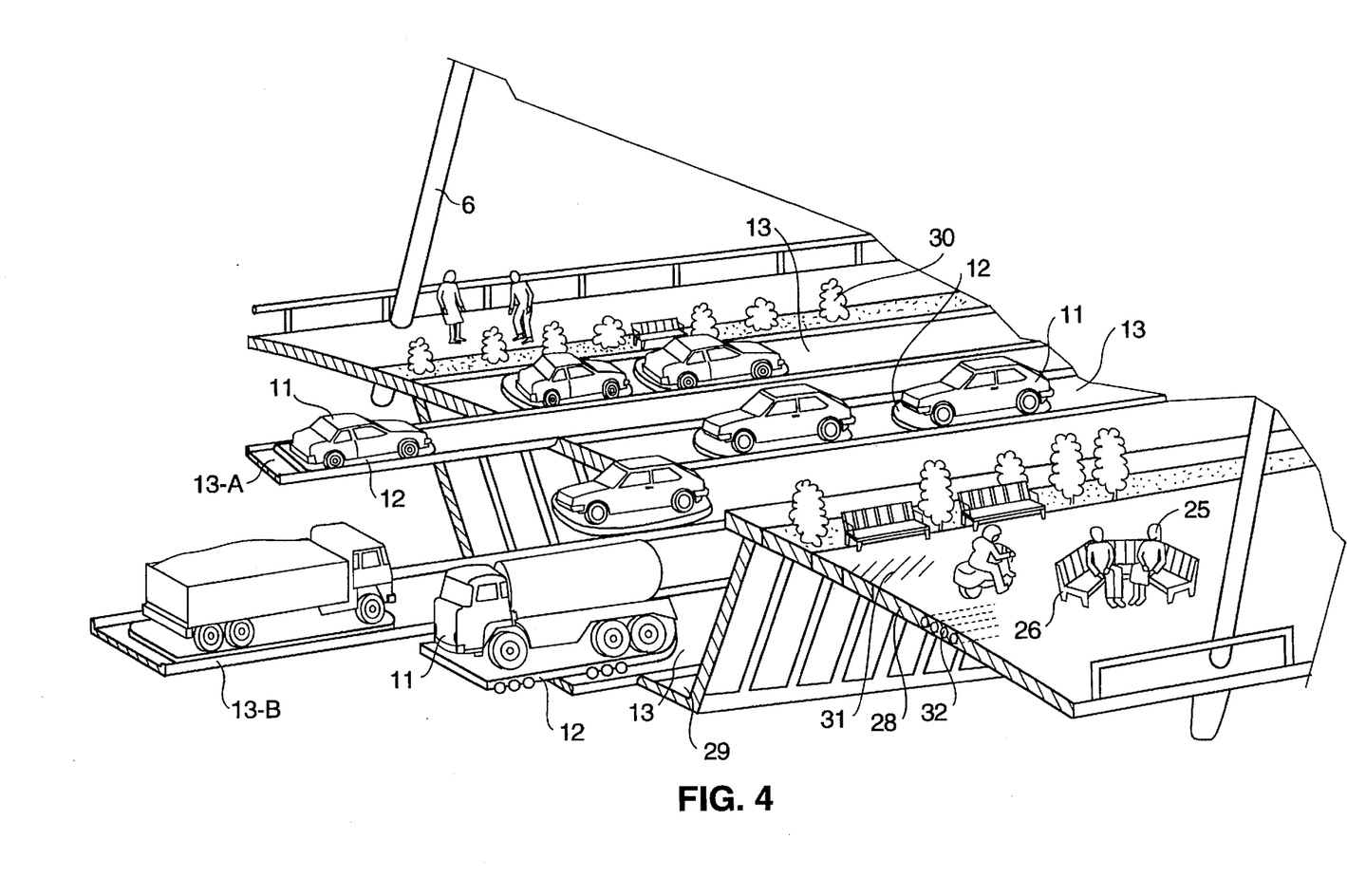
FIG. 4 illustrates a bird's-eye view of a cross section of the box girder embodiment of the present invention.

FIG. 4 is a bird's-eye view of a cross section of the box girder 28. The box girder 28 is hung by the cable 6. A total of six automatic transportation lanes 13 are installed on the box girder 28. On the upper deck of the box girder 28, four automatic transportation lanes 13-A are designated for passenger vehicles. Two additional automatic transportation lanes 13-B are reserved for larger-sized trucks and containers and are installed inside of the box girder 29. Lighting 27 is installed inside of the box girder 29. It way be possible to divide the inside of the box girder 29 into upper and lower sections and to install all vehicle transportation lanes inside of the girder. In this case, the top of the box girder becomes available for other purposes such as pedestrian walkways, bicycle and motorcycle paths, shops, green zone etc.

In FIG. 4, there are four automatic transporting lanes 13-A and 13-B, two lanes in each direction. The width of the lane is 2.5 m×4=10 m from edge to edge. A lane for larger-sized trucks and containers 13-B is installed inside of the box girder 29. As no center divider is necessary in this system, all of the transportation lanes can be installed toward the center of the bridge, so that the stability of the bridge is greater than that of a conventional bridge. Such a system would also require less maintenance work. The total traffic capacity of the system illustrated in FIG. 4 is 16×4=64 lanes of a conventional road. On the other hand, the length of a truck or pallet in the larger-sized lane is set at approximately 12 meters. The vehicle capacity would then be 80 meters÷12 meters=6 vehicles, or 6 times larger than that of a usual road. The following Table 1 is a comparison of the total road traffic capacity of conventional bridges and the bridge proposed in this invention as seen in FIG. 4.

TABLE 1

<comparison of traffic capacity>

| type of bridge | type of girder | number of lanes | traffic capacity (# of vehicles/h) |
| --- | --- | --- | --- |
| ① | box girder | 4 | approx. 4,000 |
| ② | truss girder | 4 | approx. 6,000 |
| ③ | truss girder | 4 | approx. 6,000 |
| ④ | box girder | upper: 4 lower: 2 | approx. 77,332 |

All data is based on the following conditions.
1. Transportation speed: 80 km/h
2. Traffic capacity of one lane: 1,000 vehicles/hour
3. Distance between vehicles on a regular highway: 80 m
4. Length of truck or pallet for a passenger vehicle: 5 m
5. Length of truck or pallet for larger-sized vehicles: 12 m
Bridge types are as follows:
①The second and third Kurushima bridges ②Akashi bridge ③Onaruto bridge ④Proposed bridge of this invention The width of the bridge in FIG. 4 is approximately 30 m: 10 m is required for the vehicle transportation system installed in the center of the bridge floor; 10 m of free space is then left on either side of the transporting lanes, respectively. The total area of the 10 km bridge is approximately 0.3 km². The amount of free space available on the bridge for purposes other than the transportation system would be approximately 0.2 km². As seen in FIG. 4, a green zone is installed. Parks, shops and restaurants etc. could also be located on the bridge floor, making the bridge system a more "people friendly" environment. This kind of access for people to a bridge has never before been possible using a conventional bridge concept.

Other use of the free space area could be made. For example, in FIG. 4, solar cell 31 are installed on the bridge floor. The generated electricity from the solar cells is utilized to mobilize the truck or pallet 12 and reduce the outside energy consumption of the transportation system. Moreover, a heat pump 32 is also installed on the bridge floor, absorbing heat energy from the sun. This collected heat could be used for melting snow, especially in a country with a cold climate. The following Table 2 is a comparison of the amount of free space available between this invention and a conventional bridge system.

Figure 5:
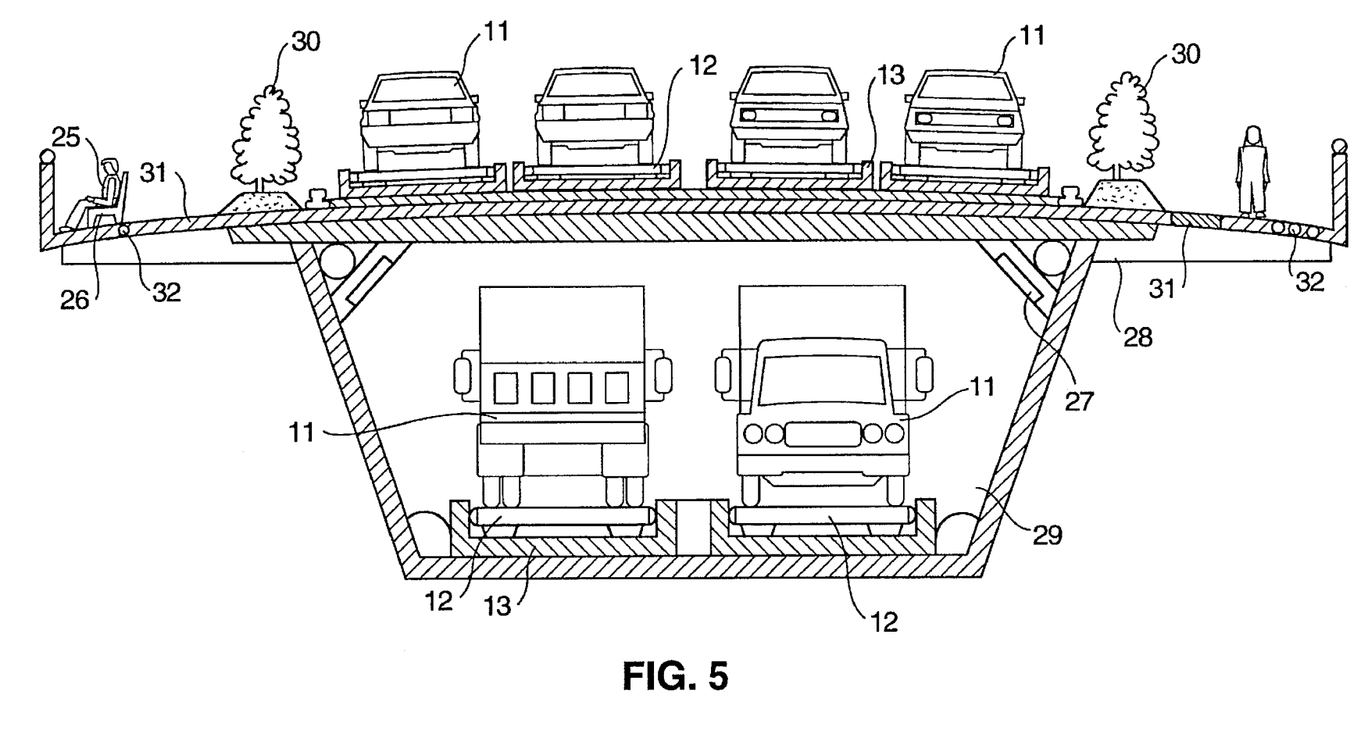
FIG. 5 shows a cross section of the bridge of FIG. 4.

FIG. 5 shows the cross section of the bridge of FIG. 4. The automatic transporting lanes 13-B for larger-sized trucks, buses, containers etc. are installed inside the box girder 29. The cross section of a truss girder bridge equipped with an automatic vehicle transportation system can easily be inferred from FIG. 4 or FIG. 5. The exterior frame of a box girder bridge is the same as that of a truss girder bridge. With the installation of the automatic transporting lanes 13-B, the gravity center and the load center of the bridge become closer, producing a more stable bridge structure than that of a conventional bridge.

TABLE 2

<comparison of walk way width>

| type of bridge | type of girder | number of lanes | width of girder (meters) | width of traffic lane (meters) | width of walkway (meters) | width of center divider (meters) |
| --- | --- | --- | --- | --- | --- | --- |
| ① | box girder | 4 | 27 | 20 | 0 | 2.5 |
| ② | truss girder | 4 | 36 | 25 | 0 | 2.5 |
| ③ | truss girder truss | 4 | 34 | 30 | 0 | 3.5 |
| ④ | box girder | upper: 4 lower: 2 | 30 — | 10 10 | 20 — | 0 0 |

Bridge types are as follows:
①The second and third Kurushima bridges

②Akashi bridge

③Onaruto bridge

④Proposed bridge of this invention

What is claimed is:

1. A bridge with an automatic vehicle transportation system installed on a floor of said bridge, said transportation system comprising:

a plurality of individually controllable trucks or pallets, each of which is adapted to carry vehicles independently of one another, a transportation lane positioned on the floor of the bridge that allows said trucks or pallets to be conveyed through said bridge, entrance and exit mode converting interchanges for said vehicles to embark and disembark at both ends of said bridge, each converting interchange including a loading and offloading mechanism which places embarking vehicles onto the truck or pallets, and a control center for the transportation system for said trucks or pallets, including a control mechanism which controls the movement and regulates the distribution of the trucks or pallets across the bridge along the transportation lane and controls their merging onto and diverging off of the transportation lane.

2. In the bridge, as set forth in claim 1, wherein said vehicles are automobiles, passenger cars, truck-vehicles and buses.

3. In the bridge, as set forth in claim 1, including a plurality of transportation lanes each of which is designated for only automobiles, for only passenger cars, for only truck-vehicles, for only buses, or for only motorcycles and bicycles, and combined lanes designated for said automobiles, said passenger cars, said truck-vehicles, said buses, said motorcycles and said bicycles.

4. In the bridge, as set forth in claim 1, having a plurality of transportation lanes one of which is designated for said truck-vehicles and another of which is designated for containers.

5. In the bridge, as set forth in claim 1, wherein said transportation system is facilitated by at least one of the following means: a railway, a rail or guide way assisted by a linear motor, cable car system, or conveyor.

6. In the bridge, as set forth in claim 1, having a girder which is a box girder in which the transportation lane for said transportation system is installed.

7. In the bridge, as set forth in claim 1, having a girder which is a truss girder in which the transportation lane for said transportation system is installed in a lower section of said truss girder.

8. In the bridge, as set forth in claim 1, at least one of the following are installed on said bridge floor: a pedestrian path, a green zone, shops, a park, solar cells, an electricity generator, a heat pump, heat absorbing panels, pipes for gathering heat.

9. A bridge with an automatic vehicle transportation system installed on a floor of said bridge, said transportation system comprising:

a plurality of individually controllable trucks or pallets each of which is adapted to carry containers independently of one another, a transportation lane positioned on the floor of the bridge that allows said containers to be conveyed through said bridge, an entrance garage for said containers to be unloaded from a transporting vehicle to said trucks or pallets, an exit garage for said containers to be loaded from the trucks or pallets, a control center for the transportation system for said trucks or pallets, including a control mechanism which controls the movement and regulates the distribution of the trucks or pallets across the bridge along the transportation lane and controls their merging onto and diverging off of the transportation lane.

10. In the bridge, as set forth in claim 9, having a plurality of transportation lanes each of which is designated for only automobiles, for only passenger cars, for only truck-vehicles, for only buses, or for only motorcycles and bicycles, and combined lanes designated for said automobiles, said passenger cars, said truck-vehicles, said buses, said motorcycles and said bicycles.

11. In the bridge, as set forth in claim 9, having a plurality of transportation lanes wherein one of the transportation lanes is designated for said truck-vehicles and another of the transportation lanes is designated for said containers.

12. In the bridge, as set forth in claim 9, wherein said transportation system is facilitated by at least one of the following means: a railway, a rail or guide way assisted by a linear motor, cable car system, or conveyor.

13. In the bridge, as set forth in claim 9, having a girder which is a box girder in which the transportation lane for said transportation system is installed.

14. In the bridge, as set forth in claim 9, having a girder which is a truss girder in which the transportation lane for said transportation system is installed in a lower section of said truss girder.

15. In the bridge, as set forth in claim 9, having at least one of the following installed on said bridge floor: a pedestrian path, a green zone, shops, a park, solar cells, an electricity generator, a heat pump, heat absorbing panels, pipes for gathering heat.

16. A bridge with an automatic vehicle transportation system installed on a floor of said bridge, said transportation system comprising:

a plurality of trucks or pallets each of which is adapted to carry vehicles independently of one another, a transportation lane positioned on a floor of the bridge that allows said trucks or pallets to be conveyed through said bridge, entrance and exit mode converting interchanges for said vehicles to embark and disembark at both ends of said bridge, each converting interchange including a loading and offloading mechanism which places embarking vehicles onto the trucks or pallets, and removes disembarking vehicles from the trucks or pallets, and a control center for the transportation system for said trucks or pallets, including a control mechanism which regulates the distribution of the trucks or pallets across the bridge along the transportation lane and controls their merging onto and diverging off of the transportation lane, and further wherein said bridge is particularly designed for loads represented by fully loaded but closely spaced transportation lanes, wherein each transportation lane has a width about the same as the width of the trucks or pallets it is to handle.

17. A bridge with an automatic vehicle transportation system installed on a floor of said bridge, said transportation system comprising:

a plurality of trucks or pallets each of which is adapted to carry vehicles independently of one another, a transportation lane positioned on a floor of the bridge that allows said trucks or pallets to be conveyed through said bridge, entrance and exit mode converting interchanges for said vehicles to embark and disembark at both ends of said bridge, each converting interchange including a loading and offloading mechanism which places embarking vehicles onto the trucks or pallets, and removes disembarking vehicles from the trucks or pallets, and a control center for the transportation system for individually controlling the progress of said trucks or pallets along the transportation lane, including a control mechanism which regulates the distribution of the trucks or pallets across the bridge along the transportation lane and controls their merging onto and diverging off of the transportation lane, wherein vehicles are accommodated by the control center at random arrival times.

* * * * *